United States Patent [19]
Bartel, Jr.

[11] 3,764,962
[45] Oct. 9, 1973

[54] CIRCUIT FOR WATER DEPTH METER

[75] Inventor: Charles F. Bartel, Jr., Rosemount, Minn.

[73] Assignee: Vexilar, Inc., Minneapolis, Minn.

[22] Filed: Jan. 10, 1972

[21] Appl. No.: 216,545

[52] U.S. Cl. ............................ 340/3 R, 340/3 C
[51] Int. Cl. ............................................. G01s 9/68
[58] Field of Search ................... 340/3 R, 3 C, 3 A

[56] References Cited
UNITED STATES PATENTS

| 3,267,413 | 8/1966 | Beebe et al. | 340/3 R |
| 3,504,333 | 3/1970 | Grada et al. | 340/3 R |
| 3,226,673 | 12/1965 | Cudworth | 340/3 C |
| 3,389,372 | 6/1968 | Halliday et al. | 340/3 C |
| 3,559,158 | 1/1971 | Bettcher | 340/3 R |

Primary Examiner—Richard A. Farley
Attorney—Ralph L. Dugger et al.

[57] ABSTRACT

A depth meter for use in water, which has a rotating disc carrying a light emitting diode that lights up to give depth indications. The rotating disc also carries a magnet which is used to generate a signal to initiate transmission of a high frequency signal through a crystal. The crystal receives any returned signal reflected from the bottom or an object in the water. The reflected signal is amplified, and a pulse discrimination circuit is used to determine if the amplified signal is acceptable. An acceptable signal trips a power circuit to a light emitting diode to indicate the depth of the bottom or object causing the reflected signal.

13 Claims, 5 Drawing Figures

United States Patent [19]
Bartel, Jr.
[11] 3,764,962
[45] Oct. 9, 1973
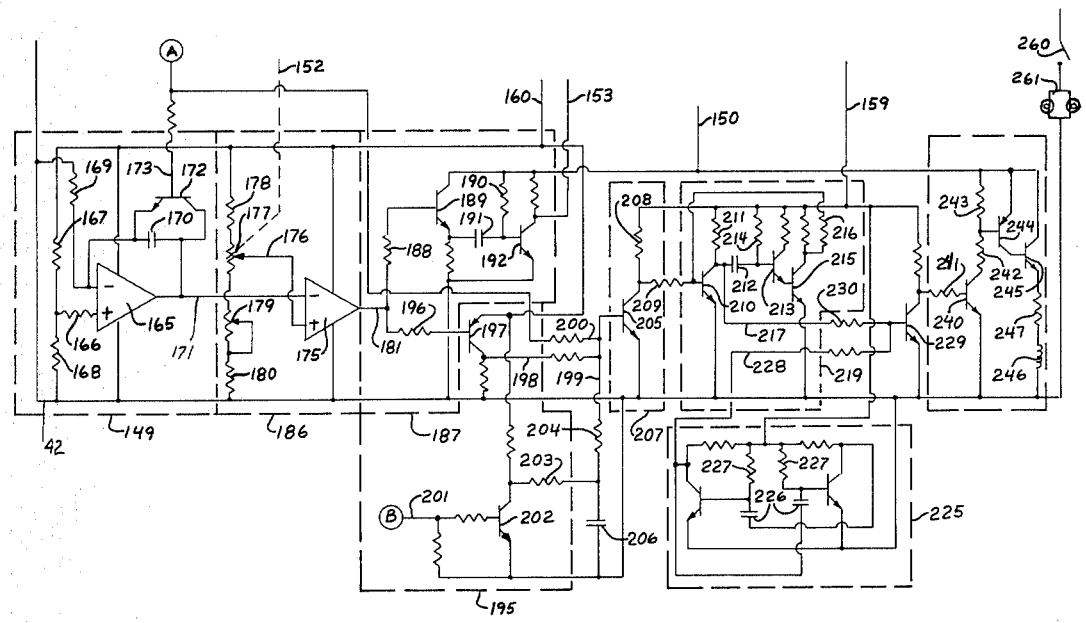

CIRCUIT FOR WATER DEPTH METER

BACKGROUND OF THE INVENTION

1. Field of the Invention

The present invention relates to circuitry for providing adequate transmission of and insuring proper reception of reflected signals through a water depth indicator crystal transmitter.

2. Prior Art

Various depth indicators have been advanced in the art, and some utilize a circuit that is initiated by a rotating or moving magnet passing over a coil. However, the pulse caused by the magnet passing over the coil is not greatly amplified in prior art devices, and this means that the positioning of the magnet with respect to the coil, as well as the quality of the magnets themselves has to be uniform in order to get a proper signal each time the pulse is delivered. In the present device, the magnetic pulse is passed through an amplifier so that a saturated signal is received each time a pulse is delivered, and the saturated signal is the signal that is used for timing, and for triggering the oscillator used for developing the transmitted signal. By setting the level of the pulse necessary to trigger the amplifier relatively low, the spacing of the magnet from the coil, the strength of the magnet, and uniformity of the magnet are not of particular significance as long as the minimum signal required is generated.

SUMMARY OF THE INVENTION

A depth meter which utilizes a transmitted high frequency signal from a crystal transducer, and which receives a reflected signal from a surface, such as the bottom or a fish, and uses the reflected signal to initiate indicating means to indicate the depth of the surface causing the reflection.

The meter includes a rotating disc indicator device which rotates behind a meter panel, and is driven by an electric motor that is controlled at a desired speed. The unit is made so that one rotation of the disc equals a known time. As shown the time cycle is sufficient to give depth indicators up to about 100 feet of water depth.

The rotating disc carries a small magnet, that passes over a coil on a circuit board positioned behind the disc, and this is used as a detector pulse to, at the zero position, commence transmision of a high frequency signal transmitted by a crystal transducer in the water, and also for initiating a signal of known duration used for a signal to other circuit components.

The crystal used transmits out the high frequency signal, and then also receives any reflected signals, and generates an output from the reflected signal that is in turn amplified, and is used for energizing a light emitting diode carried by the rotating disc, which will light up when the reflected pulse triggers the diode. The place where the diode lights during each revolution of the disc will appear as a relatively steady dot of light adjacent a depth indicator to indicate the depth of the object reflecting the signal.

This circuit includes the additional feature of having a horn alert circuit to indicate when the water is equal to or less than a preselected depth so that a boat operator can receive a warning at the time a shallow bottom is being approached. This will aid docking of botas with relatively deep draft, in shallow water.

Other objects of the invention will become apparent as the description proceeds.

DESCRIPTION OF THE PREFERRED EMBODIMENT

Figure 1:
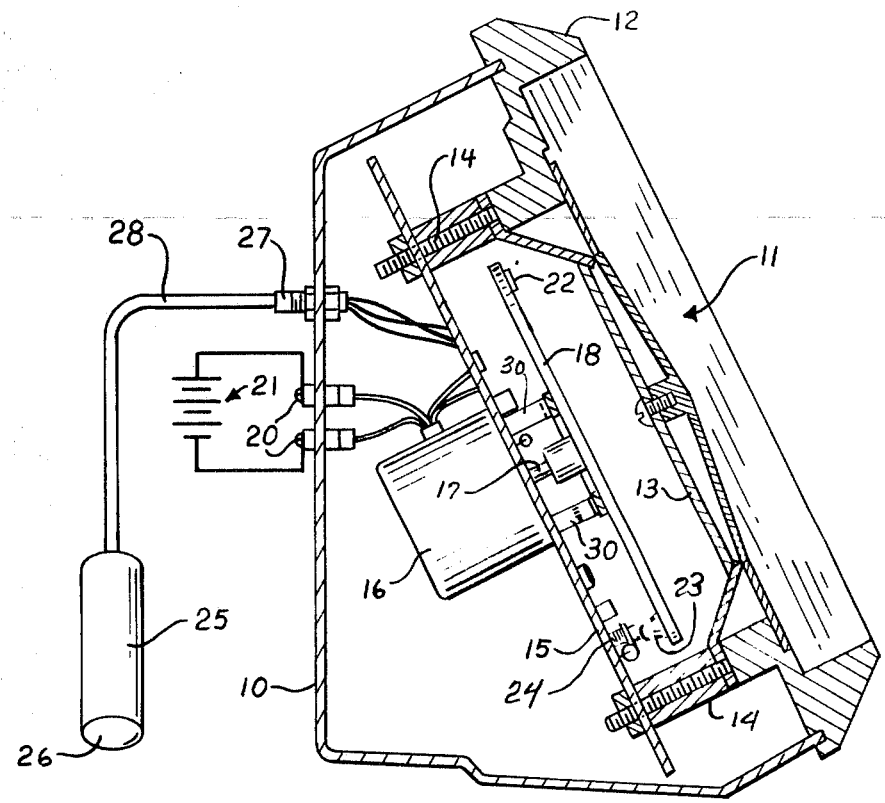
FIG. 1 is a sectional view of a typical meter housing having a rotating disc indicator operated according to the present invention.
Figure 2:
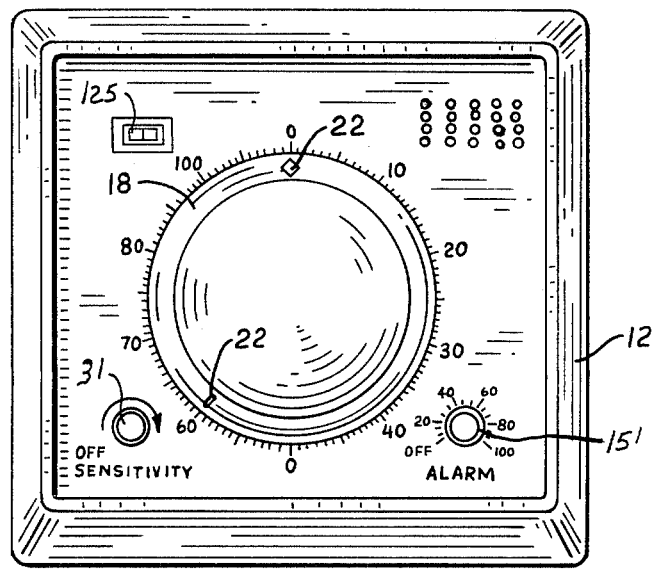
FIG. 2 is a front view of the meter device of FIG. 1.

Referring to FIG. 1, an instrument housing 10 houses a water depth meter constructed according to the present invention, and the open face 11 of the housing is surrounded by a rim member 12. The rim 12 has standoff mounting members 14 that in turn mount a circuit board 15 on which the circuit components to be described are mounted. Circuit board 15 has an electric motor 16 mounted thereon, and the motor shaft 17 extends through the board 15, and mounts a rotating disc 18. The disc 18 is circular and when the motor 16 is running, rotates at a preselected speed, in the form shown approximately 1440 revolutions per minute. The motor, and the circuit board, are powered through suitable connections 20, leading to a battery or other source of power 21 that can be remote power, or a battery pack. Rotating disc 18 carries two components utilized with the present invention. These include a light emitting diode indicated at 23, mounted on the front face of the disc and aligned with an opening in the outer cover of the meter so that when the light emitting diode lights, it can be viewed, as shown at FIG. 2. The rotating disc 18 also mounts a ceramic magnet 23 adjacent this outer edge, which is on the backside of the disc 18, and this magnet, as will be explained, is used for providing a triggering pulse for the circuit for initiating the operational cycles for the depth finder. The triggering pulse occurs when the magnet 23 passes over a coil 24 mounted on the circuit board 15, and positioned to align with the magnet during one portion of each rotational cycle of the disc 18, as shown in the "zero" depth position.

The depth meter is utilized with a transducer assembly 25, which has a barium titanate crystal 26 at its outer end. The transducer is connected through a suitable jack 27 and cord 28 to other components on the circuit board. The exact connection of course can be varied to suit existing conditions. It should further be noted that power is carried to the light emitting diode 22 through a slip ring type contacts which are indicated at 30 and comprise metal strips attached to the circuit board 15, and which have outer ends that resiliently engage a metal ring on the disc 18 so that power can be carried to the light emitting diode 22 as the disc rotates.

The magnet 23 is a permanent ceramic magnet, and the magnetic field generated thereby will produce a signal in the coil 24 each time the magnet rotates past the coil.

In the operation of depth indicators, it has been known to utilize suitable crystal transducers that are positioned in the water and aimed in the desired direction, and then transmit a high frequency signal through the crystal. The crystal is also used to receive the reflected high frequency signal to energize a meter indicating depth. The elapsed time between the transmission of the signal and the receipt of the reflected signal at the crystal indicates the distance from the surface causing the reflection to the crystal. The crystal transducers are well known in the art, and also various types of transmitters are well known. In the newer type depth indicators light emitting diodes are used as indicators but it has been found that the circuits presently used have given rise to various errors. First, the light emitting diodes may be mounted on the rotating discs, and light up once during each revolution of the disc in response to reflected signals to indicate the depth. The transmission of the transmitted signal must be initiated at a preselected position of the disc, rather than on a regular time basis, because the rotational speed of the motor driving the disc can vary slightly. This means that for each revolution there must be some trigger point for transmission of the high frequency signal through the crystal. Then, too, there must be an adequate amplification of the reflected signal received back at the crystal; there must be ability to filter out noise, and there also must be some assurance that the pulse or signal being used to energize the light emitting diode is a reflected pulse, and not noise.

Figure 3:
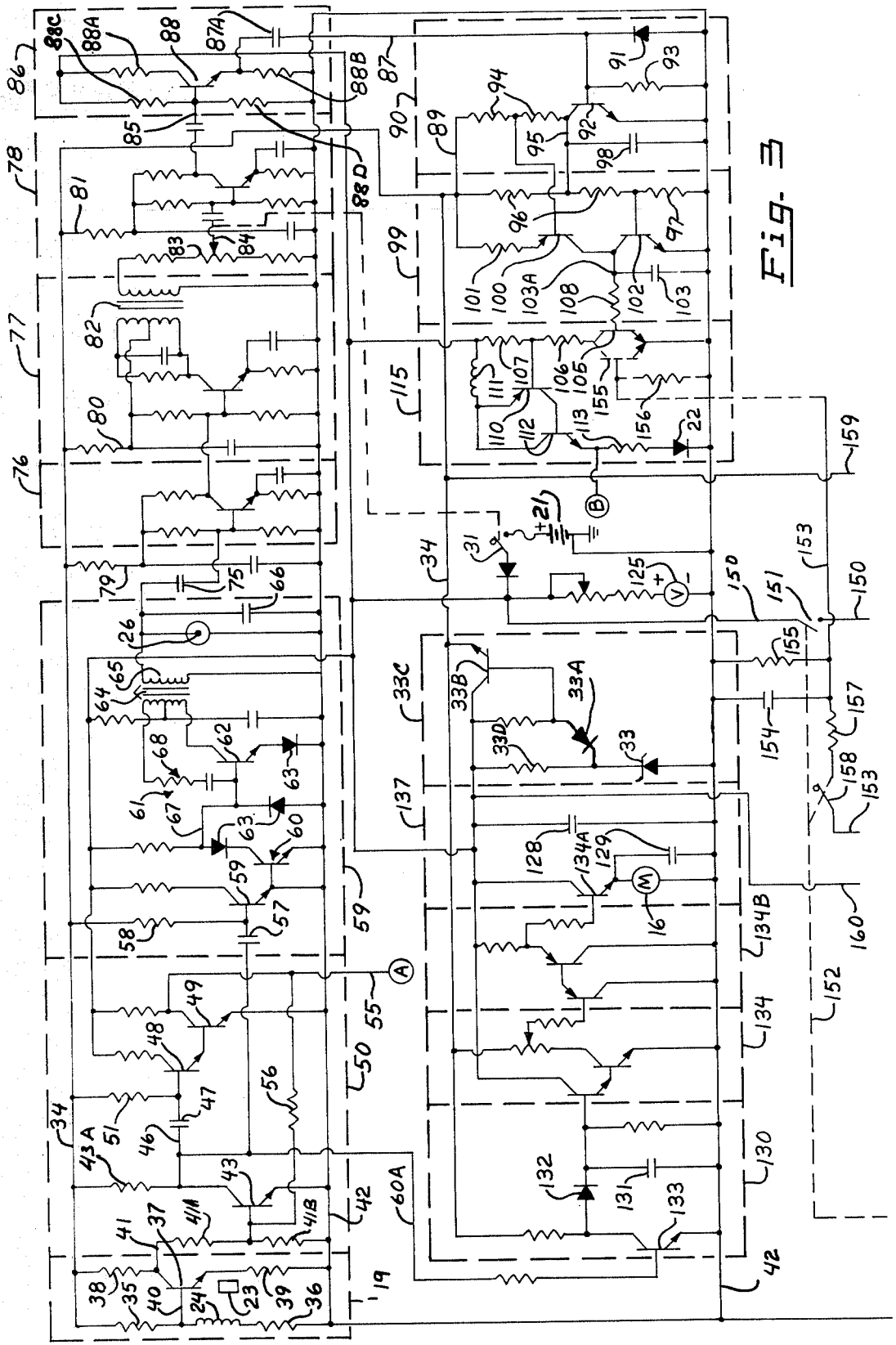
FIGS. 3 and 4 are schematic representations of the depth indicating circuitry of the present invention.
Figure 4:
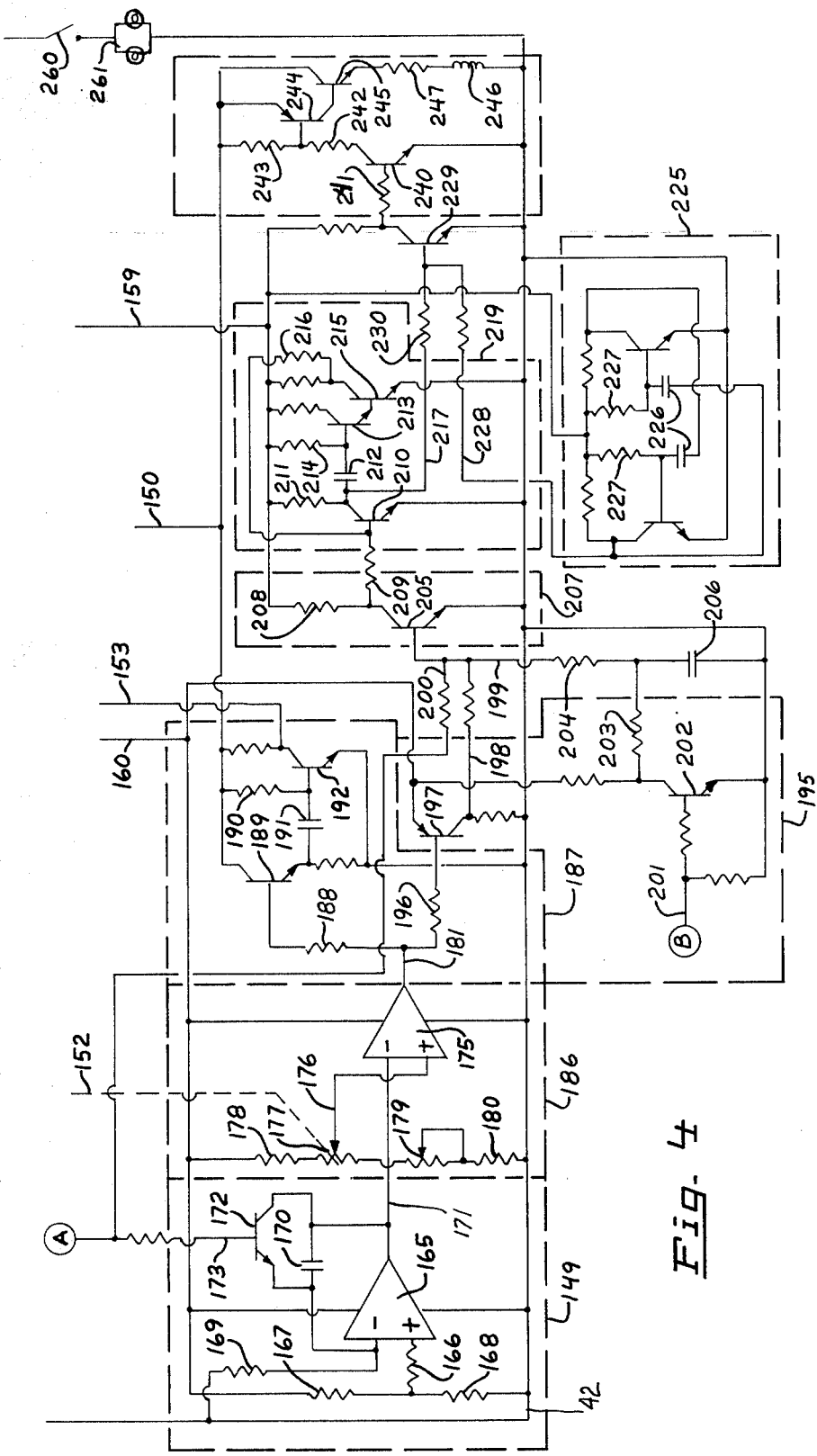

Now, referring to FIGS. 3 and 4, primarily, a main on-off switch 31 controls power to a main power line 32, which is at battery voltage, as shown 12 volts.

The power output along the main power line 32 is connected into voltage regulator circuitry as outlined in dotted lines at 33C so that there is controlled 7.5 voltage along a line 34. This level of voltage is substantially below the normal battery voltage of 12 volts, and insures that as long as the battery has any life the proper controlled voltage will be supplied to the critical components of the circuit, including the timing means and the pulse initiation means.

The voltage regulator for obtaining the control 7.5 volt line is shown generally at 33C, and includes a zener diode 33, which is connected between ground and the 12 volt line through a 390 ohm resistor 33D. The voltage between the zener diode 33 and the resistor 33D drives a diode bias network 33A, which in turn drives a pass band transistor 33B that provides current regulation to the line 34 for providing a substantially regulated 7.5 volt reference line to provide a regulation for fluctuation in battery potential and still have a known voltage level for giving accurate timing. The battery main switch also turns on the motor 16.

When the power switch 31 is on, assuming that the motor 16 is rotating, the circuit is energized, the disc 18 is rotating and the magnet 23 will pass over the coil 24 shown schematically at the upper left hand corner of FIG. 3 and located in a pulse generating section outlined in dotted lines at 19. The coil 24 is connected between 7.5 volt line 34 and ground, and is series connected with a 33K resistor 35, and a 10K resistor 36. A high gain transistor 37 has its collector connected through a 6.8K resistor 38 to line 34, and the emitter of transistor 37 is connected through a 1.2K resistor 39 to ground. The base of the transistor 37 is connected with a line 40 to a junction between the end of coil 24 and the adjoining end of resistor 35.

The resistor selection for resistors 35 and 36 is such that the voltage along line 40 is in the range of 2.5 volts. The transistor 37 comprises a bias control amplifier. Any increase or reduction of the voltage at the base of transistor 37 will cause a corresponding increase or reduction of the potential at its emitter. The transistor 37 is a high gain transistor, and when the magnet 23 moves past the coil 24, the magnet causes a momentary voltage pulse, that acts in opposition to the voltage on line 40, and reduces the bias voltage to the transistor 37. This immediately causes a high gain on the collector side of transistor 37, and a pulse will be carried on line 41 connected at a junction between the collector of transistor 37 and resistor 38. Line 41 is connected to a ground line 42, through a series combination of a first 220K resistor 41A and a 6.8K resistor 41B.

Figure 5:
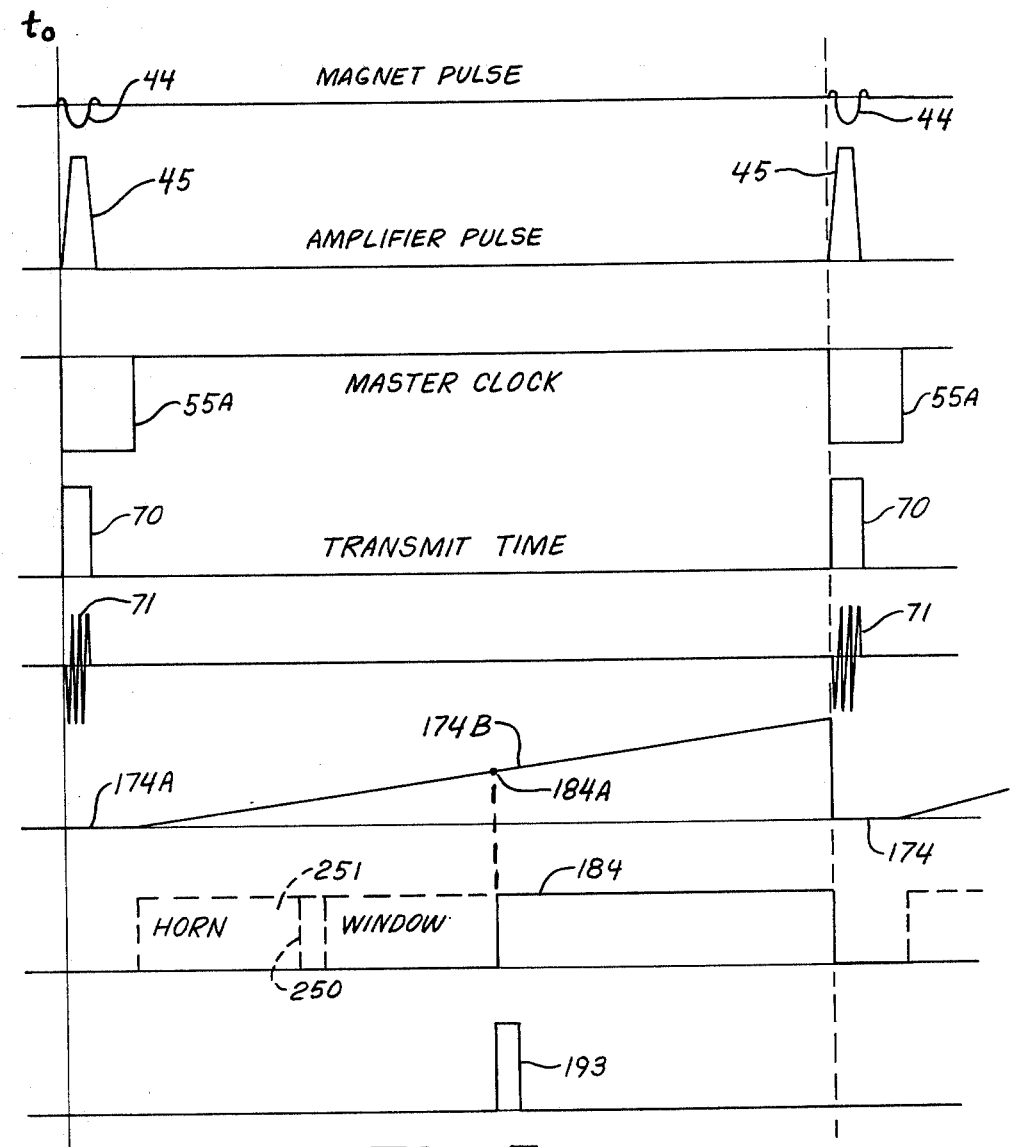
FIG. 5 is a timing diagram relationship graphically showing operation of certain portions of the present invention.

Referring to FIG. 5 momentarily, the wave form caused by the magnet passing adjacent the coil 24 is illustrated at the top line at 44. It creates a negative voltage. The time the voltage appears is not of great significance, as long as it reduces the bias to the base of transistor 37 to cause the one shot master clock to operate.

The voltage at the collector of transistor 37 is normally in the range of 2 volts as shown, and when the magnet 23 causes the negative voltage form shown in FIG. 5 to be applied to the base of transistor 37 the voltage on line 41 at the collector of transistor 37 will increase up to the voltage on line 34, which is substantially 7.5 volts. Actually the gain of the transistor 37 is so high that if there was more potential on line 34, it would be supplied along line 41. The form of the pulse at line 41 is indicated at 45 in FIG. 5. The pulse 45 is clipped so that it has a square top, which represents the 7.5 voltage maximum on line 34. This positive pulse is supplied to the base of transistor 43, which is connected to line 41 at a junction between the resistors 41A and 41B. The pulse turns on the transistor 43 causing it to conduct through a 10K resistor 43A from line 34 to its collector. The emitter of transistor 43 is connected to the ground line 42.

Conduction of transistor 43 reduces the voltage at its collector causing an inverse or negative pulse along a line 46 connected to the collector thereof and also connected to a capacitor 47 (as shown 0.047 microfarad) that is connected between line 46 and the base of transistor 48. The emitter of transistor 48 is connected to the base of a transistor in a Darlington arrangement. The pulse on line 46 is illustrated at 46A in FIG. 5.

The master clock section which is outlined in dotted lines at 50 includes the transistor 43, the capacitor 47, and transistors 48 and 49. In addition, the master clock includes a 120K resistor 51 connected between line 34 and the base of transistor 48 at a junction between the capacitor 47 and the base. The master clock is a flip-flop circuit, and once the negative pulse appears on line 46 it pulls down one side of the capacitor 47 immediately, and the potential build up of the capacitor 47 through resistor 51 takes 4.0 milliseconds, during which time the transistor 48 of course is turned off because of the drop to change the capacitor 47. This provides a known state for transistor 48 and also for transistor 49 for the length of time permitted by the RC network of capacitor 47 and resistor 51. The collector of the transistor 49 is held high when transistors 48 and 49 are held off. This gives a known time duration pulse on line 55 connected to the collector of transistor 49.

The negative pulse appearing on line 36 from the collector of transistor 43 is on the order of 2.0 milliseconds, and the exact time of this pulse is not critical. The master timing clock portion 50 then provides a 4.0ms negative pulse along the line 55, that is used through junction A for other components to be explained. This pulse is shown at line 55A in FIG. 5. The line 55 also is connected through a 220K resistor 56 to the base of transistor 43.

The negative pulse 45 appearing on line 46 is also carried along a line that is connected to a 0.018 microfarad capacitor 57 forming a portion of the oscillator drive and crystal transmitter section indicated generally at 59. The pulse on line 46 further is carried along the line 60A to a motor control that will be further explained.

The capacitor 57 is connected to a resistor 58 that is in turn connected between the line 34 and the base of a transistor 59. The emitter of transistor 59 is connected to the base of a transistor 60 forming the control for the oscillator circuit which is generally indicated at 61. The oscillator circuit can be of any general design, and includes a transistor 62 and diodes 63, that provide for control and for current stabilization when the control signal from the transistors 59 and 60 is turned off to quickly stop the oscillation of the oscillator. The transformer 64 provides the tank circuit for the oscillator and crystal transmitter. The output winding 65 of the transformer is connected across the crystal 26 that is shown schematically in the drawing. A 1600 picofarad capacitor 66 is utilized for tuning purposes across the crystal as well.

The negative pulse on line 46 drops the potential on capacitor 57, and the charging of the capacitor through the 150K resistor 58, takes 1.8 milliseconds at the potential on line 34. The operation of this RC circuit regulates the time of transmission of the signal from the oscillator. During this time, the transistor 59 is shut off, as is the transistor 60. The collectors of these transistors are connected to the battery potential line 32, and their collectors go high. This signal is carried by line 67 to the base of the transistor 62 causing the transistor 62 to be turned on. The capacitor-resistor network indicated generally at 68 (.004 microfarad capacitor and 100 ohm resistor) are selected in combination with the tank circuit and the other components connected to the transformer so that the oscillator develops 200 Kilohertz (KHz) 200 volt peak to peak output signal across the transformer output winding 65. This signal is transmitted by the crystal 26 into the water. The oscillator section 59 transmits for 1.8 ms controlled by the RC circuit 57 and 58. Referring again to FIG. 5, at 70, the 1.8 ms pulse is illustrated in the time graph. This 1.8 ms pulse is the time of transmission, and in line 71, there is illustrated the 200 volt peak to peak 200 KHz signal 71 which is transmitted.

It might be mentioned at this time that the transmitted signal will be picked up by the rest of the circuitry, and will cause the light emitting diode 22 to light, because the transmitted pulse will ring through the circuit, and the light will light at a zero point where the magnet 23 crosses the coil 24. The magnet 23 crosses the coil 24 approximately every 43 ms, (plus or minus 1 ms) so each cycle of operation repeats at that frequency.

Once the signal has been transmitted by the crystal, and the oscillator shut off, any reflected return signal will then be picked up by the crystal 26. This causes the crystal to deliver an output signal through a 300 picofarad AC pick off capacitor 75. This crystal output is received by the input of first stage of a three stage amplifier. These stages are outlined in dotted lines at 76, 77 and 78. Because the type of amplifier is a matter of choice by the designer, the construction of the amplifiers will not be explained in detail. It should be noted that each of the amplifier sections has a resistor-capacitor series connection across the lines to de-"Q" and decouple the amplifier from the lines to prevent interference from high frequency signals that might be superimposed in the line. The first such arrangement is shown at 79, and includes a 100 ohm resistor and a 0.01 microfarad capacitor, for the second stage 77, there is a line 80 including a 10 ohm resistor and a 0.001 microfarad capacitor, and the line 81 is coupled across the power lines with the same value resistor and capacitor as in line 80. First and second stage amplifiers are bandpassed amplifiers in order to reduce the amount of noise and to give some shaping to the reflected signal received by the crystal. The second stage includes a transformer 82 that is tunable so that it can be peaked for maximum return signal.

The secondary of the transformer 82 is connected through a 5K potentiometer indicated at 83 that is the sensitivity adjustment, and the wiper 84 is coupled to the main on-off switch so that the sensitivity of the output can be manually adjusted by rotating the on-off switch.

The output of the third stage amplifier 78 is connected through a line 85 to the input of an emitter follower transistor circuit outlined at 86. This gives current amplification for the voltage signal coming from the output of amplifier 78. The same voltage level signal is coming out of the circuit along the line 87 as is put in, except it has a higher drive capability. The emitter follower 86 includes a transistor 88, the base of which is controlled by the output of amplifier 78. A suitable 100 ohm resistor 88A is connected between the collector of transistor 88 and the power line, and a 10K resistor 88B is connected between the emitter and ground. The resistors 88C and 88D connected between the battery voltage line and base, and ground and base respectively are both 10K resistors. The line 87 has a 0.001 microfarad capacitor 87A therein, and this line 87 in turn is connected into a signal detector stage indicated generally at 90 by dotted lines. The diode 91 in line 87 provides a return for AC signals from ground. Line 87 is connected to the base of a transistor 92. A resistor 93 coupled between the base of transistor 92 and ground keeps the transistor 92 turned off when there is no return coming from the amplifier stage along line 87. The collector of the transistor 92 is connected to a 7.5 volt line through a pair of series connected 2.7K resistors indicated at 94.

The collector of the transistor 92 is connected with a line 95 to a junction between a pair of series connected 2.7K resistors 96, that are connected between the controlled voltage line 89 and a 5.4K resistor 97 that in turn is connected to ground. In addition, the line 95 is connected through a 0.047 microfarad capacitor 98 to ground. The resistors 96 and 97 form part of a pulse discriminator circuit outlined in dotted lines at 99.

The pulse discriminator includes a PNP transistor 100 which has its emitter connected through an 82K resistor 101 to a line 89, and its collector is connected to a collector of an NPN transistor 102 that has its emitter in turn connected to ground. The base of the transistor 100 is connected to the junction between the two resistors 94, and the base of transistor 102 is connected to the junction between resistor 97, and the adjacent series resistor 96. The collector of transistor 102 is also connected through a 0.047 microfarad capacitor 103 to ground.

The light emitting diode power driven circuit outlined in dotted lines 115 includes a transistor 105 which has its collector connected through a 1.2K resistor 106, and a 10K resistor 107 to the battery power line. The base of transistor 105 is connected through a 150 ohm resistor 108 to the collector of transistor 102.

A pair of Darlington arranged transistors are included in this circuit, and include a PNP transistor 110, having its base connected to a junction between resistors 106 and 107, and its emitter connected through an induction coil 111 to the battery potential line. The collector of the transistor 110 is connected to the base of an NPN transistor 112. The collector of transistor 112 is connected to one end of coil 111 at a junction with the emitter of transistor 110 and the emitter of transistor 112 is connected through an 8.4 ohm resistor 113 to the light emitting diode 22. The diode 22 is also connected to ground.

When either a transmitted or reflected 200 Khz signal appears on line 87 and is of proper level, the transistor 92 is turned on during the positive half cycle of the signal. The transistor 92 operates to clip the positive voltage at 0.6 volt because this is the base to emitter drop of the transistor 92. In a negative half cycle, the collector of transistor 92 is held low through the action of capacitor 98, so that the collector is held near ground or just slightly above ground potential whenever there is a signal at its base.

When the collector of transistor 92 goes low the potential at the junction between the two resistors 94 will drop to a voltage level that is substantially one half of the difference between the voltage at the collector of transistor 92 and the voltage along the 7.5 volt line 89. This signal is used in the pulse discriminator section indicated at 99 in dotted lines, and is applied to the base of the PNP transistor 100. The lower voltage at the base of transistor 100 causes the transistor 100 to be turned on and conduct.

Because the junction between the resistors 96 has ben pulled down to approximately ground potential due to the reduction of potential of the collector on transistor 92, the potential at the base of transistor 102, which is connected between the resistor 97 and the adjacent resistor 96, is reduced to a point where the transistor 102 is turned off. This means that the signal carried through transistor 100 now is applied across the capacitor 103 through junction 103A to charge this capacitor. The resistors 97 and 96 are utilized to insure that the potential on the base of transistor 102 is sufficiently low to turn off this transistor. The resistor 101 between the line 89 and the emitter of transistor 100 insures that there is a substantially uniform current flowing through the transistor 100 to charge the capacitor 103 when transistor 102 is turned off. This capacitor 103 then charges, and the voltage appearing at the junction 103A builds up on a ramp function with respect to time. When the potential level at 103A reaches 1.2 volt, the transistor 105 is turned on and the voltage level at 103A is clamped at 1.2 volt, which is the base to emitter drop of transistor 105. The capacitor 103, which as shown is 0.047 microfarads, is selected so that the charging time to reach 0.6 volt is approximately two-thirds of the normal transmit time. The transmit time is 1.8 milliseconds, and of course then the reflected signal coming back to the crystal indicating depth also is being received for 1.8 ms. Therefore the charging ramp time for capacitor 103 to reach 1.2 volts would be approximately 1.2 ms. If before the junction 103A has reached its logic level of 1.2 volt, the signal on line 87 disappears so that the transistor 92 is turned off, the transistor 102 will again immediately turn on and there will be a dead short applied across the capacitor 103. The voltage across this capacitor 103 will drop out within a microsecond or so. That means that if the pulse or signal received along line 87 is less than 1.2 ms, transistor 105 will not be turned on even though the discriminator circuit 99 will start to function. For example if the signal on line 87 is only approximately 0.8 ms the capacitor 103 will start to be charged, but when the signal on line 87 ends the transistor 92 would be turned off, and this through line 95 and transistor 102 would immediately discharge the capacitor so that junction 103A would not reach the logic level and transistor 105 would not be turned on.

Assuming that signal of proper time has appeared so that the voltage on the base of transistor 105 has exceeded the 0.6 volt necessary to turn this transistor on, this transistor acts as a current sink and immediately starts to conduct current from the bzttery line to ground through the resistors 106 and 107, which act as a voltage divider network. The voltage drop across resistor 107 in relation to resistor 106 (which are 10K and 1.2K respectively), causes the base of the transistor 110 to reduce in potential, turning this transistor on and causing conduction by the transistor. When the transistor 110 conducts, transistor 112 is turned on. The current gain is through the transistor 110, which is an PNP transistor, and the power drive is through the emitter follower transistor 112. Current is conducted through the coil 111 from the battery line, through transistor 110, and through an 8.5 ohm wire wound resistor to the light emitting diode 22, causing the LED to light up for the time of receipt of the signal along line 87 as long as this signal is on for greater than 1.2 ms. The resistor 113 on the input of the light emitting diode 22 is for providing a voltage drop down to the required 2.7 volts for the LED. The coil 111 is to give some control to the current wave form because the light emitting diode draws a tremendous current as soon as it is turned on, and the coil provides some retardation or roll off of the current signal.

Thus there are two locations in each revolution of the rotating disc at which the light emitting diode will light up. One is that at the zero point when the magnet 23 passes over coil 24, and the initial transmission rings through the circuit to light up the diode 22. The other is when the reflected pulse is received by the crystal, which reflected pulse is amplified through the amplifier system, and passed through the pulse discriminator to light the diode 22. The pulse discriminator 99 filters out any extraneous noise of short duration, so that a sustained pulse of at least 1.2 ms is necessary to turn on the light emitting diode.

The main power circuit has a voltage meter 125 thereacross and include a suitable resistor and adjustable potentiometer so that the voltage of the battery being used can be indicated visually to an operator.

The drive for the motor 16 can be of any desired configuration to give a relatively well governed motor speed, and can even be mechanically governed motor. When the main switch is turned on initially the motor 16 receives battery voltage to start it because transistor 134A is conducting the base of this transistor will be high. In the control shown after the motor starts the magnetic pulse generated by the magnet 23 and coil 24 is utilized as a "kicker circuit" to provide for motor regulation. First, a filter capacitor 128 is applied across the line for filtering out noise. The filter capacitor 128 is on the order of 300 microfarads, and a 6.8 microfarad filter capacitor 129 is also applied across the motor 16 for filtering.

When the magnetic kicker signals are supplied along line 60A, they are applied through a kicker circuit 130, that has a control transistor 133. The capacitor 131 is charged through a diode 132 each time the negative pulse from line 60A is applied to transistor 133. This provides a signal to a pair of transistors in a voltage control circuit outlined by dotted lines at 134. This circuit provides a control voltage to the motor drive circuit from the line 34. A potentiometer is provided on the collector of the second transistor for speed adjustment. The area indicated in dotted lines at 134B operates from the control voltage out of area 134 and is merely a current amplifier utilizing two PNP transistors which control the main power transistor 134A. The main power transistor 134A is in the motor drive circuit outlined at 137, which provides the output of the two darlingtons 134B into the motor so that a fixed voltage is provided that holds the motor at a suitable rpm.

Again, if desired, the motor may be mechanically governed instead of using the kicker circuits shown.

The circuit just described leading up to lighting of the LED, including the pulse discriminator, and the motor drive circuit is all that is essential for operation of the present invention. The novel feature of having a moving magnet that generates a pulse that can be varying in length and duration and strength, but still will give a highly amplified signal utilized for running RC circuits for fixed time generation, makes the unit very accurate even with mechanical variations in assembly. However, in addition to the visual light signal, it is in many instances desirable and even necessary to include an audible signal that is sounded when a certain depth or less is being indicated by the LED. An indicator is set to give a sound at a particular depth or less, so that when the return is coming from the bottom of a body of water indicated that the bottom is getting close, an operator can make necessary changes to avoid running aground in a boat, and also this gives an indication of rocks and the like.

Referring to the bottom portion of FIG. 3, it can be seen that the 12 volt (battery) line 150 is connected from the main on-off switch 31. A rotary on-off switch 151 is utilized in this line 150, and is mechanically connected through a suitable link 152 to a potentiometer which will be explained later. In addition, a line 153 is connected with a 0.22 microfarad capacitor 154, and a 68K resistor 155 to the ground line 42. Line 153 in turn is also connected to the base of a transistor 155, which is shown in dotted lines, and is connected across the junctions for transistor 105, and would receive the same signals at its collector and emitter. This transistor 155 is an alternate transistor used when the horn or alarm circuit to be described is utilized, and for the purposes of the discussion, it can be considered to be in the circuit as shown. A suitable 68K resistor 156 also connects between line 153 and ground adjacent the base of transistor 155.

The line 153 has a 10K resistor 157 therein, and a switch 158 connected to the link 152 for the rotary on-off switch. The rotary on-off switch also has push pull capabilities, with the same link 152, and the switch 158 is operated on a push pull basis. Therefore, lines 150 and 153 extend to the additional circuit. A controlled voltage (7.5) volt line 159 is also connected to the additional circuitry shown in FIG. 4 and 12 volt (battery) line 160 is connected down to the circuit at FIG. 4 which now is specifically referred to.

The audible signal requires a suitable time ramp generator shown in dotted lines at 149 that is independent of the other portions of the circuit, and which can be used for giving a signal output when the time elapse from initial start of a transmission signal so that when the return is received it would indicate a particular depth. The power line 160 is connected across a type 741 operational amplifier indicated at 165. This amplifier 165 is an integrating operational amplifier having an differential input, and providing an output that is normally a ramp function. The amplifier is powered across the battery line, and one of the inputs terminal thereto is connected with a 10K resistor 166 to the junction between another pair of 10K resistors 167 and 168 from the line 160 to ground. The other input terminal for the operational amplifier 165 is connected through a 220K resistor 169 to the ground line 42, and is also connected through a feed back 0.22 microfarad capacitor 170 to its output line 171. The capacitor 170 provides the output ramp generating function, and as can be seen, the line carrying the capacitor 170 is connected at a junction between the resistor 169 and the input terminal of the amplifier.

In addition, a transistor 172 is connected across the 0.22 microfarad capacitor 170. The base of the transistor is connected with a line 173 through a suitable resistor to junction A, which carries the 4.0 ms positive pulse signal from the collector of transistor 49. When the 4.0 ms signal appears on line 173, the transistor 172 conducts, shorting out the capacitor 170 and causing the operational amplifier 165 to again start its ramp output function when the signal on line 173 is removed.

Referring to the line 174 in FIG. 5, during each time period cycle the 4.0 ms signal is the flat portion of this line indicated at 174A. This is when the capacitor 170 is shorted out, and there is a low output from the operational amplifier 165. This time period of 4.0 ms equals substantially five feet of depth, (it includes the signal transmission time of 1.8 ms) so during this time when the depth is 5 feet or less, the audible signal cannot be set. After this point, on the graph, the voltage output of the amplifier 165 generates a ramp function toward its peak which is reached when the signal again appears at junction A. The slope of the ramp 174B will be determined by the size of the capacitor 170. Then, as the 43 ms period has expired, the signal will again appear at junction A and the output will be shorted, dropping down as shown to the right of FIG. 5. The operational amplifier 165 is provided with an artificial or synthetic ground through the use of the resistors 166, 167 and 168. The potential is actually above ground, so that the actual voltage level at line 174A would be approximately one-half of the battery voltage.

The output of the amplifier 165 on 171 is fed into one input terminal of a second type 741 operational amplifier 175. The amplifier 175 is powered by the power line 160, and the second input terminal of the amplifier 175 is connected to a wiper 176 of a set point adjustment potentiometer 177 that is controlled by the mechanical link 152. One end of potentiometer 177 is connected through a 1.2K resistor 178 to the line 160 and the other end is connected through a trim potentiometer 179 and 5.6K resistor 180 to ground. The trim potentiometer 179 is a factory adjustment that is to trim up the settings of the unit so that proper response is achieved. The potentiometer 177 is the set point potentiometer which is manipulated by the operator of the depth meter to adjust the depth at which the sound signal will occur. The amplifier 175 is an open loop gain amplifier, and delivers an output along its output line 181 whenever the voltage on line 171 (one input to amplifier 175) exceeds the voltage on the set point line potentiometer wiper 176 which is the other input to amplifier 175. When the voltages at the input terminals are equal there is no output along line 181.

The voltage at the input terminal connected to line 176 can be adjusted, and whenever the ramp voltage along line 171, which is represented at line 174 in FIG. 5 exceeds the level on line 176 you get a immediate output along line 181. This is illustrated generally at 185 in FIG. 5 for one set point condition where the set point level equals the voltage at starred point 184A on graph line 174B. The operational amplifier 175 actually is a change of state amplifier and gives a square output signal along line 181.

Thus, in the ramp generator outlined in dotted lines in 149 in FIG. 4 a time-voltage function is being generated. The set point comparator circuitry just described is indicated at 186 in FIG. 4. The next circuitry indicated at 187 in FIG. 3 comprises set point indicator circuitry. The square wave output along line 181 is utilized for two different functions, and as shown, the output on line 181 is applied through a 56K resistor 188 to the base of a transistor 189. This causes the transistor to conduct due to the output from amplifier 175, dropping the potential at the collector of the transistor, and giving a positive potential at the emitter, this is connected to an RC network comprising a 10K resistor 190, and a 0.01 microfarad capacitor 191 connected to the base of a second output transistor 192. When the transistor 189 conducts this will cause the collector of transistor 193 to give a positive output signal. The area 187 comprises a logic shift network as a set indicator, and the positive output along line 153, which is connected to the collector of transistor 192, assuming that the push pull switch 158 in FIG. 3 is closed will be transferred along the line 153 to the base of the transistor 155. This will cause the transistor 155 to conduct, and in turn energize the circuit to power the LED 22 in the same manner as when the transistor 105 conducts. The output along line 153 lasts only as long as it takes for the RC network 190, 191 to build up the potential on the base of transistor 192, as shown at 193 in FIG. 5, this is about 0.6 ms.

The lighting of the light emitting diode through the push pull switch 158, when the set indicator has an output, will illuminate the light emitting diode in the proper angular position during each revolution thereof. This lighting indicates the maximum depth at which the horn circuit will be activated (the horn is also activated at shallower depths). Thus the operator can adjust the set point by rotating the combination switch driving the link 152 until the light emitting diode lights and indicates the maximum depth at which the operator wants a sounding. If the operator wishes, the light emitting diode can be left in the circuit for the set indicator so that it will light up at the depth where the sounding will occur during each revolution, and will also light up when each transmitted pulse is returned. Assuming that an operator had the set point indicator set for 60 feet (the indicator is set up for 100 foot depth maximum) and had the push pull switch 158 on, and also assuming that the operator was operating in 80 feet of water, the light emitting diode would light at the zero point, as previously explained, it would light at the 60 feet point because of the output from the set indicator along line 153 to the transistor 155, and would also then light at the 80 foot point because of the reflected signal coming through the crystal transducer energizing the light emitting diode through the detector circuitry, the pulse discriminator circuitry, and the power circuitry for the light emitting diode. Then as the boat approached the 60 foot depth, the visual dots for the light emitting diode would gradually move closer together, and then when the return came at the 60 foot point the lights would merge.

The circuit area outlined in dotted lines at 195 also comprises a logic conversion. The logic conversion circuitry includes the B terminal or junction input shown in FIG. 3 above the LED, and this carries a signal when the LED is turned on. In addition the output of amplifier 175 through line 181 is applied through a 56K resistor 196 to the base of a transistor 197, which is of the PNP type. Thus when the signal from the line 181 appears at the base of transistor 197, the collector, which is connected through a suitable resistor to ground, will go low, and line 198 connected to the collector will be at a low potential. Line 198 connects through a 56K resistor to a line 199. The pulse at junction A, which is the 4 ms pulse, appears along a line 200 which connects through a 56K resistor to line 199.

A line 201 coupled to the B junction is connected through a 10K resistor to the base of a transistor 202, and through a 68K resistor to ground. The collector of the transistor 202 is connected through a 10K resistor to the line connected to the emitter of transistor 197, and this is the battery line. The collector of transistor 202 is connected through a 2.7K resistor 203 to line 199, on the opposite side of a 56K resistor 204 from the base of a transistor 205, to which the line 199 is connected. A .047 microfarad capacitor 206 is connected to the junction between resistors 203 and 204 and to ground.

When there is a positive signal on line 201 due to lighting of the diode 22, transistor 202 will conduct, causing its collector to go low. Likewise, when there is an output from the amplifier 175 there is a low potential along line 198, and when the 4 ms signal has disappeared from the line 200, the base of transistor 205 is therefore at a low level and the transistor is not conducting. However it should be noted that whenever the light emitting diode 22 is not powered, the transistor 202 will be turned off causing a high potential on the base of transistor 205 through the line 199, resistor 204, resistor 203, and the resistor between the collector of transistor 202 and the battery line, which will cause the transistor 205 to conduct.

The transistor 205 is in a circuit area indicated in dotted lines that comprises a three input NOR gate 207 so that if any of the three inputs to line 199 are high, the transistor 205 will conduct. When the three inputs to the three input NOR gate 207 are all low, the transistor 205 is cut off, and the potential in the collector of transistor 205, which is connected to the 7.5 volt line 159 through a suitable 39K resistor 208, goes high. The collector of transistor 205 is conneced through a suitable 50K resistor 209 to the base of a transistor 210. When the potential at the base of transistor 210 goes high because of the turning off of the transistor 205, the transistor 210 will conduct causing its collector to go low. The collector of transistor 210 is connected through a 10K resistor 211 to the 7.5 volt line 159 and is connected to a 0.22 microfarad capacitor 212 that in turn has its other side connected to the base of a transistor 213 and through a 680K resistor 214 to the 7.5 volt line. The transistor 213 is connected to the base of another transistor 215. The collectors of transistors 214 and 215 are each connected through suitable resistors to the 7.5 volt line, and the collector of the transistor 215 is also connected through a 56K resistor 216 back to the base of transistor 210.

When the collector of transistor 210 goes low because of turning on of transistor 205 it changes the potential to capacitor 212, and the resistor 214 and capacitor 212 form a timing clock which turns off the transistor 215 for a time approximately equal to three of the transmitted pulse periods, or approximately 139 ms. This causes the collector of transistor 215 to go high, making a signal appear through resistor 216 back to the base of transistor 210, keeping the transistor 210 conducting for this period of time. All the while that the transistor 210 is conducting, a line 217 is connected to the collector thereof is at low potential. When transistor 210 is turned off the potential on this line goes high.

The circuitry outlined in dotted lines at 225 is a 500 cycle tone generator circuit that runs all the time. It is an A-stable multi-vibrator of conventional circuitry to have an output of 500 cycles which gives a standard tone which will be used for driving the speaker to get a desired tone. The frequency of the oscillations is determined by the capacitors 226, which as shown are 0.047 capacitors and the resistors 227 which as shown are 33K resistors.

The output of the tone generator 225 is applied along the line 228 through a 56K resistor to the base of a transistor 229. Another 56K resistor 230 is in line 217. Any signal on line 217 keeps the transistor 229 turned on whenever the transistor 210 is shut off. However, when the output from the collector of transistor 210 goes low, the signal along line 228 is effective to control the transistor 229. When the transistor 210 is shut off, the collector of transistor 229 stayed low, because the transistor was conducting due to the signal from line 217. Then, when the signal at line 217 goes low, the transistor 229 alternately conducts and is shut off in accordance with the 500 cycle signal on line 228. This pulsating will cause the transistor 240, comprising the speaker drive transistor to also alternately turn on and off because the base thereof is connected to the collector of transistor 229 through a suitable resistor 241. The collector of transistor 240 is connected to the battery line through a 1.2K resistor 242, and a 10K resistor 243. The base of a PNP transistor 244 is connected to a junction between resistors 242 and 243, and the collector of this transistor 244 is connected to the base of a power transistor 245 which drives through the speaker coil 246 through a suitable resistor (approximately 12 ohm) 247. This speaker will be driven at the 500 cycle frequency to give it audible signal for the length of the speaker timing clock circuit 219 which is approximately 139 ms. This in turn is long enough so that it is audible to the human ear. Shorter periods of sound are hard to discern by humans.

In the graph representation 251 on FIG. 5 a window formed by the lack of the operational amplifier 175 is illustrated during the first part of the cycle for each period. This window illustrates the time during which the horn will sound if a return is received. A return, which powers the LED gives a pulse at junction B indicated at 250. Since the 4 ms signal on line 200 has disappeared the potential on the base of the transistor 205 will be low, the NOR gate will trip to set off the time clock 219, to initiate the speaker, indicating that a return has been received at a depth equal to or less than the set point depth. The speaker sounds for a length of time sufficient to be identified by the human ear. Of course, once the time clock 219 is reset, any more returns will again set it off so that in water of less depth than the set point a substantial continuous sound will be heard.

A push pull switch 160 also is tied in with the rotary switch 31, and energizes a light circuit 261 to provide a night dial light when using the unit in night time operations.

The on-off switch 151 can be used for disabling the horn and set point circuit if desired.

The unit is reliable and accurate in a rotating disc indicator. The magnetic pulse keeps the calibration accurate without precise control of motor speed, because only one transmission occurs during each motor revolution.

What is claimed is:

1. A depth indicator device for use in water comprising transducer means for transmitting a first signal through the water, said transducer means receiving reflected return signals when said first signal is reflected from surfaces, circuit means powering said transducer means, said circuit means including rotating drive means, signal means carried by said rotating drive means, and means to sense position of said signal means at each revolution of said rotating drive means and to deliver a control signal therefrom including high gain amplifier means for amplifying the control signal from said signal means, said high gain amplifier means providing an output pulse, a signal transmitting circuit connected to said transducer, transmitting timing means connected to be responsive to said output pulse and connected to control said transmitting circuit, said output pulse triggering said transmission timing means to cause the transmitting circuit to transmit a selected signal through said transducer means into the water for a length of time set by said transmission timing means, said selected signal reflecting to provide a reflected return signal to said transducer means after striking a surface, second amplifier means having an input connected to receive reflected return signals from said transducer means and having an output providing an amplified reflected return signal, detector means for detecting signals at the output of said second amplifier means, signal discriminator means for determining the duration of signals at the output of said second amplifier means in relation to a preselected time period, said signal discriminator means rejecting signals of less than said preselected time duration, indicator means connected to the output of said signal discriminator means, said indicator means including power drive means for driving an indicator to indicate when a reflected signal has been received by the transducer and which has not been rejected by said signal discriminator means during each revolution of said rotating drive means.

2. The combination as specified in claim 1 wherein said indicator means comprises a light emitting diode means, and said power drive means supplies current to said light emitting diode means.

3. The combination as specified in claim 1 wherein said circuit means is mounted onto a circuit board, and said rotating drive means comprises a disc-like member rotating substantially parallel to and adjacent said circuit board, said signal means comprising a magnet mounted on said disc member, and said means to sense said signal means comprising a coil mounted on said circuit board positioned in the annular path of said magnet and in position wherein the magnetic field from said magnet passes across said coil as said disc rotates to generate said control signal.

4. The combination as specified in claim 3 wherein said high gain amplifier means for said control signal comprises a bias control transistor having a collector, emitter and base, means providing a normal bias voltage on the base of said transistor, and said coil being connected in the circuit to the base of said transistor whereby voltage generated in said coil by passage of the magnet adjacent said coil is in series opposition to the voltage normally on said base and whereby the collector of said transistor raises in potential when a voltage is generated in said coil.

5. The combination as specified in claim 4 wherein said means providing a transmission of signals through said transducer comprises a high frequency oscillator, and drive means to said oscillator, said drive means including a first resistance-capacitor timing clock network, the change in potential at the collector of said bias control transistor triggering action of said first resistance-capacitance network.

6. The combination as specified in claim 1 and means to deliver a secondary signal when the return from said transducer is less than a preselected time after the transmission of the first signal through said transducer means, said means to deliver a secondary signal including means to generate a signal proportional to the time after ceasing the transmission of said first signal through said transducer, comparator means to compare the signal generated by said means to generate said proportional signal with a selected signal level, three input gate means delivering an output signal whenever transmission of said transmitted signal has ceased and the signal discriminator gives an output prior to the time when the signal from the means delivering said signal proportional to time equals said comparator signal, and separate indicator means connected to the output of said gate means to give an indication when the gate means delivers an output.

7. The combination as specified in claim 6 wherein said separate indicator means comprises an audible signal, and means connected to the output of said gate means to lock said audible signal on for a length of time sufficient to be discerned by human ear.

8. The combination as specified in claim 6 wherein said means to develop a signal proportional to time comprises an operational amplifier having an output proportional to the difference between two inputs, a feedback connection between the output of said amplifier and one input thereto, capacitance means in said feedback connection to cause generation of an output voltage function from said amplifier means, and means to short said capacitance means for a preselected length of time during the transmission of a signal through said transducer at the start of each cycle of said rotating drive means.

9. The combination as specified in claim 8 wherein said comparator means comprises a second operational amplifier having differential inputs and an open loop gain output, one of the inputs to said second operational amplifier being connected to the output of said first operational amplifier, and the other input of said second operational amplifier being connected to an adjustable voltage source.

10. The combination as specified in claim 9 and means connected to the output of said second operational amplifier effective to deliver a signal energizing said first indicator means for a preselected length of time whenever the second operational amplifier first delivers an output signal.

11. In a water depth meter including means for transmitting signals through a transducer and receiving reflected signals from a surface reflecting said transmitted signals, first means to indicate when the reflected signals are received in relation to the time when the reflected signals were first transmitted through said transducer, and second means to give a warning when a signal is returned less than a preselected time after the transmission of said signals through said transducer, said means to give said warning comprising a first operational amplifier, said first amplifier having a differential input, and one of said inputs being connected through a capacitance feedback loop whereby the output of said operational amplifier is a straight line voltage function in relation to time, means to initiate said voltage function at a preselected time in relation to the initiation of transmission of said transmitted signal, and comparator means to determine when said voltage function reaches a preselected level comprising a second operational amplifier having an open loop gain output and a differential input, a first of the differential inputs to said second operational amplifier being connected to receive the output from said first operational amplifier, and a second of said inputs to said second amplifier comprising an adjustable voltage source means, and means to deliver a warning when a reflected signal has been received before the comparator means delivers an output.

12. The combination as specified in claim 1 and second means to operate said first means comprising a timing circuit tripped by an output of said second operational amplifier operable to operate said first means for substantially the same period of time as a reflected signal operates said first means.

13. The combination as specified in claim 11 wherein said first means comprises a light emitting means, a rotating disc means carrying said light emitting means, and means to initiate a transmission of said transmitted signal at a preselected position during each rotation of said rotating disc means, comprising a magnet member and a coil member, one mounted on said rotating disc and the other spaced from and fixed with respect thereto, the magnet and coil being positioned to deliver a control signal each time the rotating disc rotates one revolution.

* * * * *

PO-1050
(5/69)

UNITED STATES PATENT OFFICE
CERTIFICATE OF CORRECTION

Patent No. 3,764,962        Dated October 9, 1973

Inventor(s)    Charles F. Bartel, Jr.

It is certified that error appears in the above-identified patent and that said Letters Patent are hereby corrected as shown below:

Column 1, line 66 "botas" should be --boats--. Column 6, line 16 "bandpassed" should be --band passed--. Column 14, line 28 "160" should be --260--; Column 14, line 53,(Claim 1, line 14) "transmitting" should be --transmission--. Column 15, line 4,(Claim 1, line 32) "duration" should be --period--. Column 16, line 5, (Claim 8, line 5) after "said" insert --operational--; Column 16, line 8, (Claim 8, line 8) before "amplifier" insert --operational--; after "amplifier" cancel --means-- (first occurrence); Column 16, line 17, (Claim 9, line 6) before "operational" insert --mentioned--; Column 16, line 23, (Claim 10, line 4) after "first" insert --mentioned--; Column 16, line 52, (Claim 12, line 1) "1" should be --11--.

Signed and sealed this 16th day of April 1974.

(SEAL)
Attest:

EDWARD M. FLETCHER, JR.
Attesting Officer

C. MARSHALL DANN
Commissioner of Patents